United States Patent
Darcangelo et al.

(10) Patent No.: US 6,322,425 B1
(45) Date of Patent: Nov. 27, 2001

(54) COLLOIDAL POLISHING OF FUSED SILICA

(75) Inventors: Charles M. Darcangelo, Corning; Robert Sabia, Big Flats; Harrie J. Stevens, Corning, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/364,143

(22) Filed: Jul. 30, 1999

(51) Int. Cl.⁷ .................................................. B24B 1/00
(52) U.S. Cl. ................... 451/41; 451/60; 51/308; 51/309
(58) Field of Search .................... 451/41, 56, 57, 451/59, 60; 51/308, 309

(56) References Cited

U.S. PATENT DOCUMENTS

| | | | |
|---|---|---|---|
| 5,266,088 | 11/1993 | Sandusky et al. | 51/298 |
| 5,816,891 | * 10/1998 | Woo | 451/41 |
| 5,816,895 | * 10/1998 | Honda | 451/41 |
| 5,913,712 | * 6/1999 | Molinar | 451/41 |

FOREIGN PATENT DOCUMENTS

| | | |
|---|---|---|
| 0 773 270A2 | 5/1997 | (EP) . |
| 0 826 757A1 | 3/1998 | (EP) . |
| 0 786 504A3 | 5/1998 | (EP) . |
| 0 874 036A1 | 10/1998 | (EP) . |
| 64-40267 | 2/1989 | (JP) . |
| 96/38262 | 12/1996 | (WO) . |
| 97/08689 | 3/1997 | (WO) . |
| 97/43087 | 11/1997 | (WO) . |
| 97/47430 | 12/1997 | (WO) . |
| 98/50200 | 11/1998 | (WO) . |

* cited by examiner

*Primary Examiner*—M. Rachuba
(74) *Attorney, Agent, or Firm*—Angela N. Nwaneri; Vincent T. Kung

(57) ABSTRACT

A polishing application uses alkali, colloidal silica for polishing silicate-based glasses. Preferably, the silica solutions are adjusted to a pH of or above 10. The polished silicate-based glass surfaces have surface finishes consistently below 2 Å Ra. The unique method first polishes a surface of the substrate with an aqueous solution of at least one metal oxide abrasive and further polishes the surface of the substrate with an alkali aqueous solution of colloidal silica. Preferably, to the final smoothness of 2 Å Ra or less.

22 Claims, No Drawings

COLLOIDAL POLISHING OF FUSED SILICA

TECHNICAL FIELD

This invention relates to a unique method of polishing silicate-based glasses with colloidal silica at a high pH.

BACKGROUND ART

Application of colloidal suspensions for polishing advanced materials has become an exceedingly critical aspect of final part formation for the glass and microelectronics industries. Silica and alumina colloids are commonly utilized for polishing various microelectronic materials (copper, tungsten, silicon, etc.), and ceria colloids are frequently used for high quality glass surface processing.

Critical issues in generating high quality optical surfaces for silicate-based glasses, such as fused silica, include the removal of surface and subsurface damage remnant from various preliminary grinding processes and the generation of relatively small topographical features with a Ra typically below 5 Å. For primarily mechanically-oriented abrasive such as zirconia and alumina, the final surface finish tends to be dictated by the size and morphology of the abrasive grains. For chemical-mechanical polishing abrasives such as cerium and iron oxides are likely used, since residual damage on the glass surface is lessened since the abrasives are heat treated to be a hardness comparable or softer than that of the glass. For this reason, cerium oxide has been the abrasive of choice for the majority of glass polishing applications since the 1940s.

The development of colloidal silica as a polishing abrasive is two fold. Colloidal silica has a spherical morphology and varied particle size (typically 20–50 nm diameter) which minimizes scratches in softer materials. By mixing colloidal silica in aqueous solution for polishing materials such as aluminum and silicon, the surface of the metal substrate hydrolyses and permits the abrasive nature of the colloidal silica to remove the reaction layer, while minimizing interactions with an underlying surface.

For glass polishing, pH is most commonly adjusted to be acidic in order to prevent dissolution of the glass surface. This procedure has resulted in part from the fact that the different glasses will corrode and form reaction layers in widely varying fashions. By polishing glass at a relatively low pH, the glass surface does not corrode, but rather has the opportunity to chemo-mechanically interact with the cerium oxide abrasive and promote removal in a controlled manner.

DISCLOSURE OF INVENTION

The present invention is a process for the application of alkali, colloidal silica for polishing silicate based glasses, such as fused silica aluminosilicates borosilicates titania-silicates, or corrosion resistant mixed alkali glasses. Preferably, the silica solutions are adjusted to a pH of or above 10. The polished silicate-based glass surfaces have surface finishes consistently below 2 Å Ra. Most preferably, the surface finish is about 1 Å Ra.

Although colloidal silica in neutral and acidic environments has certainly been applied to various glasses with mixed results, this invention results in the processing of highly polished surfaces for fused silica by the controlled polishing with colloidal silica adjusted above pH 10. By first polishing the glass to a surface finish below 10 Å using conventional abrasives, the application of the colloidal silica in a second polishing step allows for the improvement in surface quality by the combination of surface corrosion by the alkali solution and removal of the continually-forming hydrated surface layer by the spherical colloidal silica. We also have found small particle size colloidal silica to be preferred. In comparison to colloidal silica polishing of glass at lower pH, the solubility of the glass surface and the stability of the colloidal solution interfere with and prevent significant improvements in surface finish. Critical to this finishing protocol is the need to remove surface and subsurface damage prior to the colloidal silica polishing step in order to prevent the alkali solution from etching the damaged areas. Furthermore, a soft polishing pad must be used during the colloidal silica polishing step to prevent damage commonly induced when hard pads contact the glass surface during colloidal abrasive polishing.

BEST MODE OF CARRYING OUT INVENTION

Our process centers on the use of a commercially available, colloidal silica polishing abrasive marketed for microelectronics applications.

Our method for final polishing silica substrates comprises the steps of providing a silica substrate, first polishing a surface of the substrate with an aqueous solution of at least one metal oxide abrasive to a surface roughness Ra ranging from 6 to 10 Å; and further polishing the surface of the substrate with an alkali aqueous solution of colloidal silica to a surface roughness Ra of 5 Å or less. Preferably, the first polishing step polishes the surface of the substrate to a surface roughness Ra of about 8 Å. Preferably, the further polishing step polishes the surface of the substrate to surface roughness Ra of about 2 Å or less.

The metal oxide abrasive is alumina, titania, zirconia, germania, silica or ceria. Preferably, the metal oxide abrasive is cerium oxide.

Generally, the aqueous solution of colloidal silica is buffered to a pH ranging from 8 to 12 or 10–15. Preferably, the aqueous solution of colloidal silica is buffered to a pH ranging from 10.5 to 13.5.

Generally, the colloidal silica has an average particle size of 50 nm or less.

The process depends on surface corrosion by the alkali solution and partially on a preferred removal of microscopic peaks on the glass surface by abrasive pad interactions with the surface to promote improved overall roughness qualities through reducing peak-to-valley heights on both macroscopic and microscopic scales. Typically, the particle size ranges from 10 to 50 nm and preferably ranges from 20 to 50 nm. Particle size and surface area dimensions are understood to be greater than zero.

In one embodiment, the colloidal silica acts as a cleaning agent and removes any residual abrasive from previous polishing steps. For example, the colloidal silica removes any remaining cerium oxide from the first polishing step.

Generally, the silica substrate is made of silica, fused silicates, or glasses thereof. Preferably, the silica substrate is fused silica.

Typically, a hard polishing pad carries out the first polishing step and a soft polishing pad carries out the further polishing step. Preferably, the hard polishing pad is a blown polyurethane and the soft polishing pad is a napped polyurethane.

EXAMPLE

Samples of fused silica glass were machined via grinding and lapping processes to form a flat surface with minimal subsurface damage. A first polishing step was applied to each sample using a cerium oxide abrasive (Ferro Corporation, Product Code 482) and a hard polishing pad (Rodel Incorporated, Product Code MHC-14B), thus generating a surface finish of Ra=8 Å (Table 1). The abrasive used for the second polish was a commercially available colloidal silica (Cabot Corporation, Product Code A2095). The colloidal silica had a surface area of 200 m$^2$/g or less. The solution had been dispersed to a pH of 10, and was used in combination with a soft polishing pad (Rodel Incorporated, Product Code 204). Final surface finishes were measured using an atomic force microscope to have a Ra less than 2 Å (Table 2).

Table 1 below shows atomic force micrograph of fused silica surfaces polished using cerium oxide as first polishing step.

TABLE 1

| Image Statistics | |
|---|---|
| Img. Z range | 47.947 nm |
| Img. Mean | −0.0002 nm |
| Img. Rms (Rq) | 1.636 nm |
| Img. Ra | 1.034 nm (10.34Å) |

Table 2 below shows atomic force micrograph of fused silica surfaces polished using colloidal silica at a pH 10–11 as a second and final polishing step. The fused silica surface had a roughness (smoothness) of 1.73 Å.

TABLE 2

| Image Statistics | |
|---|---|
| Img. Z range | 5.179 nm |
| Img. Mean | −0.00005 nm |
| Img. Rms (Rq) | 0.173 nm (1.73Å) |
| Img. Ra | 0.135 mn |

The data shows that colloidal silica in a pH 10 solution for polishing fused silica has proven effective in generating fine surface finishes with Ra<2 Å. This fine of a surface finish could not be generated for lower pH solutions for colloidal silica due to the low solubility of glass at low pH. The data shows the usefulness of a commercially available, colloidal silica polishing abrasive for the microelectronics field. The polishing protocol of using colloidal silica dispersed to pH 10 for polishing fused silica coupled with using the dispersion in a second polishing step provides superpolished surfaces which the industry previously could not provide.

Z range is the ratio of peaks to valleys on the polished surface. Rq is the root means square of the roughness. Ra is the average roughness. The key measurement is Ra.

In addition to these embodiments, persons skilled in the art can see that numerous modifications and changes may be made to the above invention without departing from the intended spirit and scope thereof.

We claim:

1. A method for final polishing silica substrates comprising the steps of:
   providing a silicate-based glass substrate;
   first polishing a surface of the substrate with an aqueous solution of at least one metal oxide abrasive to a surface roughness (Ra) ranging from about 6 Å to about 10 Å; and
   further polishing the surface to a surface roughness (Ra) of about 5 Å or less, with an aqueous, alkali solution, having a pH value of about 10.5 or greater, of colloidal silica.

2. The method according to claim 1, wherein the first polishing step polishes said surface of the substrate to a surface roughness (Ra) of about 6 Å.

3. The method according to claim 1, wherein the further polishing step polishes said surface of the substrate to a surface roughness (Ra) of about 2 Å or less.

4. The method according to claim 3, wherein the further polishing step polishes said surface of the substrate to a surface roughness (Ra) of about 1 Å to 2 Å.

5. The method according to claim 1, wherein the metal oxide abrasive is selected from the group consisting of alumina, titania and zirconia.

6. The method according to claim 1, wherein the metal oxide abrasive is cerium oxide.

7. The method according to claim 1, that further comprises removing surface and subsurface damage from the substrate prior to carrying-out the further polishing step with colloidal silica.

8. The method according to claim 1, wherein the aqueous solution of colloidal silica is buffered to a pH of about 10.5 to about 17.

9. The method according to claim 8, wherein the aqueous solution of colloidal silica is buffered to a pH of about 10.5 to 13.5.

10. The method according to claim 8, wherein the aqueous solution of colloidal silica is buffered to a pH of about 10.5 to 12, for $SiO_2$ or $TiO_2$—$SiO_2$ glasses.

11. The method according to claim 8, wherein the aqueous solution of colloidal silica is buffered to a pH of about 11 to 14, for $Al_2O_3$—$B_2O_3$—$SiO_2$ glasses, or corrosion resistant mixed alkali glasses.

12. The method according to claim 1, wherein the silica substrate is made of silica, fused silicates, or glasses make thereof.

13. The method according to claim 1, wherein the silica substrate is fused silica.

14. The method according to claim 1, wherein the colloidal silica is spherical in shape.

15. The method according to claim 14, wherein the spherical colloidal silica removes surface corrosion affected by the alkali solution and removes any continually-forming hydrated surface layer from locally high regions on the substrate surface.

16. The method according to claim 1, wherein the colloidal silica has an average particle size ranging from about 10–50 nm.

17. The method according to claim 16, wherein the colloidal silica has an average particle size ranging from about 20–45 nm.

18. The method according to claim 1, wherein the colloidal silica has a surface are of 200 m$^2$/g or less.

19. The method according to claim 1, wherein a hard polishing pad carries out the first polishing step.

20. The method according to claim 19, wherein the hard polishing pad is made of blown polyurethane.

21. The method according to claim 1, wherein a soft polishing pad carries out the further polishing step.

22. The method according to claim 21 wherein the soft polishing pad is made of napped polyurethane.

* * * * *